US008089871B2

(12) United States Patent
Iloglu et al.

(10) Patent No.: US 8,089,871 B2
(45) Date of Patent: Jan. 3, 2012

(54) METHOD AND APPARATUS FOR TRAFFIC CONTROL OF DYNAMIC DENIAL OF SERVICE ATTACKS WITHIN A COMMUNICATIONS NETWORK

(75) Inventors: Ali M. Iloglu, Laurance Harbor, NJ (US); Han Q. Nguyen, Marlboro, NJ (US); John T. Mulligan, Brick, NJ (US); Samir S. Saad, Long Branch, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 768 days.

(21) Appl. No.: 11/090,634

(22) Filed: Mar. 25, 2005

(65) Prior Publication Data

US 2006/0230444 A1    Oct. 12, 2006

(51) Int. Cl.
G01R 31/08 (2006.01)
G06F 7/04 (2006.01)
G06F 11/00 (2006.01)
G06F 12/14 (2006.01)
H04L 12/28 (2006.01)
H04L 12/56 (2006.01)

(52) U.S. Cl. .................. 370/230; 370/235; 370/395.32; 370/401; 726/23; 726/26

(58) Field of Classification Search .................. 370/229, 370/230, 231, 235, 395.2, 395.21, 401
See application file for complete search history.

(56) References Cited

U.S. PATENT DOCUMENTS 7,062,782 B1 * 6/2006 Stone et al. ...................... 726/22
7,382,769 B1 * 6/2008 Rijsman ......................... 370/352
7,769,873 B1 * 8/2010 Mackie ........................... 709/229
2002/0032854 A1 * 3/2002 Chen et al. ..................... 713/151
2002/0083175 A1 * 6/2002 Afek et al. ..................... 709/225

FOREIGN PATENT DOCUMENTS

| EP | 1 566 947 A | 8/2005 |
| WO | WO 01/46807 A | 6/2001 |
| WO | WO 02/25402 A | 3/2002 |
| WO | WO 02/25402 A2 * | 3/2002 |

OTHER PUBLICATIONS

Sharad Agarwal, Travis Dawson and Christos Tryfonas, DDos Mitigation via Regional Cleaning Centers, Jan. 2004, Sprint ATL Research, pp. 1-7.*
Sharad Agarwal, Travis Dawson and Christos Tryfonas, DDoS Mitigation via Regional Cleaning Centers, Jan. 2004, Sprint Corporation, pp. 2-4 and 7.*
EPO Search Report dated May 23, 2006, of corresponding European Patent application No. EP 06 11 1718, 2 pages.
Office Action for CA 2,540,802, May 26, 2009, copy consists of 6 pages.

* cited by examiner

Primary Examiner — Chirag Shah
Assistant Examiner — Ashley Shivers

(57) ABSTRACT

A method and apparatus for providing traffic management for distributed denial of service (DDOS) traffic. Within a communications network, a DDOS detection system monitors network traffic to identify traffic that is designed to attack a particular server within the network and their entry points into the network. A traffic routing control unit is requested to deny service to the DDOS traffic. By selectively manipulating the routing information propagated to network edge routers, the traffic that is denied service is limited to mostly DDOS traffic and is routed to a cleaning center or a null address in the most effective fashion.

17 Claims, 2 Drawing Sheets

METHOD AND APPARATUS FOR TRAFFIC CONTROL OF DYNAMIC DENIAL OF SERVICE ATTACKS WITHIN A COMMUNICATIONS NETWORK

BACKGROUND OF THE INVENTION

1. Field of the Invention

The present invention generally relates to traffic management within a communications network, and more particularly, to management of distributed denial of service traffic within a communications network.

2. Description of the Background Art

In modern communications networks, network security has become a paramount issue. One form of attack on servers connected to a communications network involves providing a high volume of communication traffic to a particular server. The volume of attack traffic can be so large that an attacked server is caused to "crash" or to have slow processing that makes the server unable to process legitimate traffic in a timely manner. When anomalously high volumes of traffic are detected that originate from a particular router address, a portion of the network can be deactivated to stop the flow of traffic to the server being attacked. Alternatively, the traffic that is destined for the server under attack can be reflected by the router servicing that particular server. Such remedies are inefficient and stops or reflects not only traffic from the attacker, but also traffic from legitimate sources.

Therefore, there is a need in the art for a dynamic and granular traffic management technique that will improve the efficiency of handling an attacker's traffic to protect the attacked server.

SUMMARY OF THE INVENTION

The present invention is a method and apparatus for providing traffic management of distributed denial of service (DDOS) traffic. Within a communications network, a traffic routing control unit (e.g., an intelligent route service control point (IRSCP)) monitors network traffic to identify traffic that is designed to attack a particular server within the network and deny service to that traffic. The traffic is rerouted by the control unit controlling the routing information of each edge router within the network. The traffic that is denied service is routed to a cleaning center or is "black holed" such that the attacking traffic is removed from the network. The IRSCP can also redirect the traffic to a preferred cleaning center based on a criteria such as at least one of network load, type of traffic, utilization, delay and the like. The legitimate traffic from a cleaning center is then routed to the server that was the target of the attack. By dynamically altering the routing information of the edge routers, the network can dynamically and with fine granularity adjust the routing of traffic so that traffic that is to be denied service is mostly DDOS traffic and is efficiently and rapidly routed to the cleaning center or is "black holed". As such, the network is protected in the most efficient manner from the traffic of the attacker.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
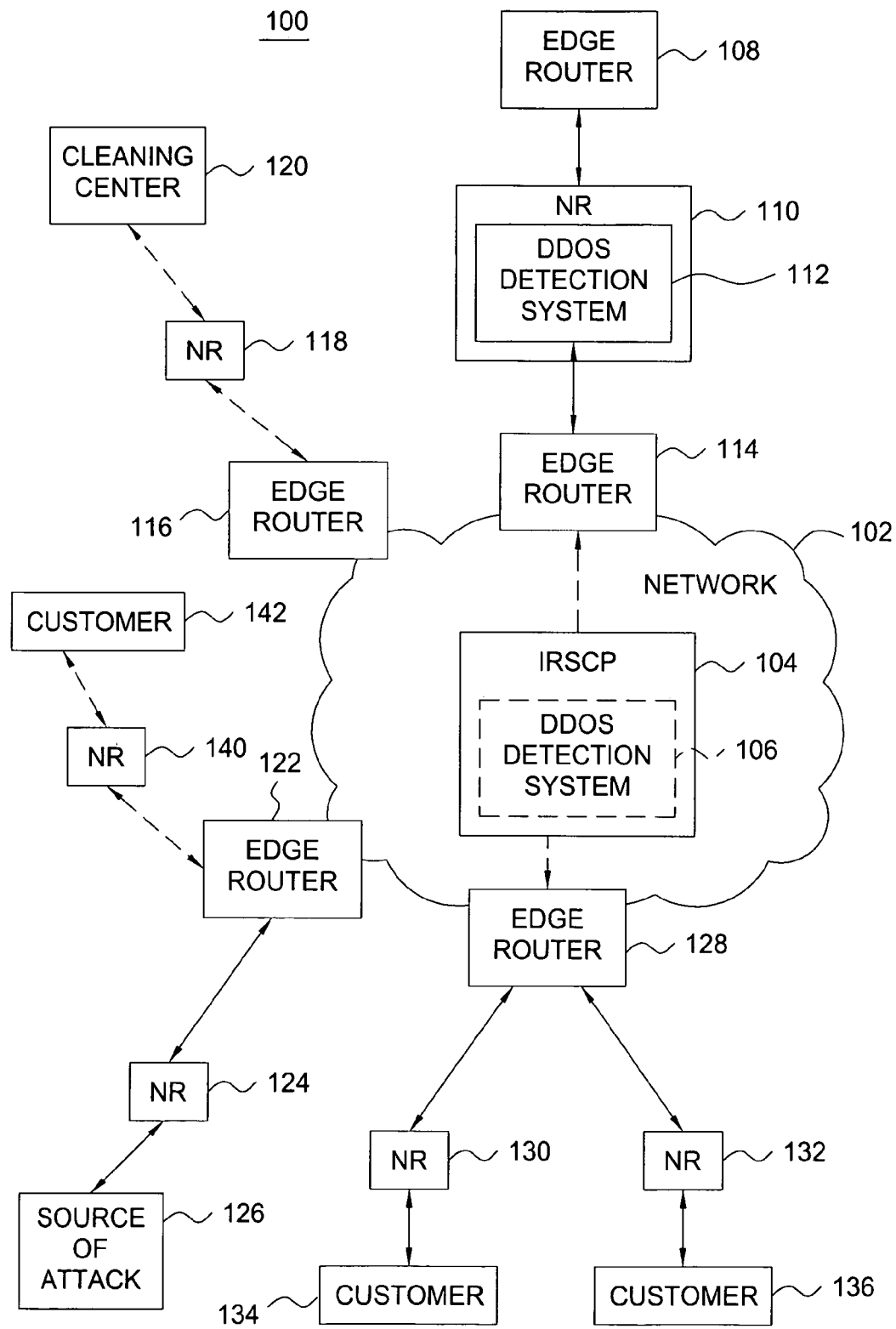
FIG. 1 depicts a block diagram of a communications network arranged in accordance with the present invention.

FIG. 1 depicts a communications network 100 comprising a network infrastructure 102, an intelligent route service control point (IRSCP) 104 (i.e., a traffic routing control unit), a plurality of edge routers 114, 116, 122, 128, and a variety of network services users that are attached to these edge routers. Edge router 128 is coupled to neighbor router (NR) 130 and customer 134 as well as NR 132 and customer 136. The customers 134 and 136 use the services of the network 102 to communicate amongst a number of servers and other users that are connected to the network 102. The network 102 may be providing services to carry any form of data including voice, video, computer information, and the like. Also attached to the network through edge router 122 is NR 124 and a source of attack data 126. Such a source will target a server that is connected to the network 102 and "flood" the network with communications traffic that is addressed to the attacked server. For example, an attacked server is identified as server 108 that is connected to edge router 114 via NR 110. The network 102 further contains edge router 116 that is connected to NR 118 and a cleaning center 120. The cleaning center 120 is used by the network 102 to clean data as described below.

Traffic on the network 102 is monitored by a traffic routing control unit such as the IRSCP 104. The IRSCP 104 dynamically adjusts traffic flow through the network 102 as described in commonly assigned U.S. patent application Ser. No. 11/019,845, filed Dec. 22, 2004, which is incorporated by reference herein in its entirety. The IRSCP 104 uses a Border Gateway Protocol (BGP) and an Interior Border Gateway Protocol (IBGP) to control the routing information of the edge routers within the network 102.

To facilitate identification of attackers, the IRSCP 104 comprises a DDOS detection system 106 that monitors traffic for anomalies such as high volume of traffic originating from one particular router and destined for one particular server. Alternatively, the DDOS detection system 112 may be located within an NR, such as NR 110. As such, the DDOS detection system 112 monitors traffic to the server 108. When anomalous traffic is detected, the system 112 reports to the IRSCP 104 to request that the offending traffic be rerouted. The DDOS detection system may also be positioned within the edge routers 114, 116, 122, 128. When attacking traffic is detected by the DDOS detection systems either 106 or 112, the detection system 112 or 106 notifies the IRSCP 104 that an attack is under way. When such an attack is detected the IRSCP will protect the network by rerouting traffic in accordance with the present invention. The IRSCP 104 sends commands via IBGP or BGP to specific edge routers (e.g., router 122) and possibly other routers handling traffic to the target server 114. These commands cause the traffic from router 122 to be either removed from the network (i.e., black holed by routing the traffic to a null address) or routed to a cleaning center 120. At the cleaning center 120, legitimate traffic from customer 142 that is coupled to router 122 via NR 140 is removed from the attacking traffic. The legitimate traffic is returned to the network 102 via NR 118 and edge router 116. Consequently, the attacking traffic is removed from the network with precision.

Figure 2:
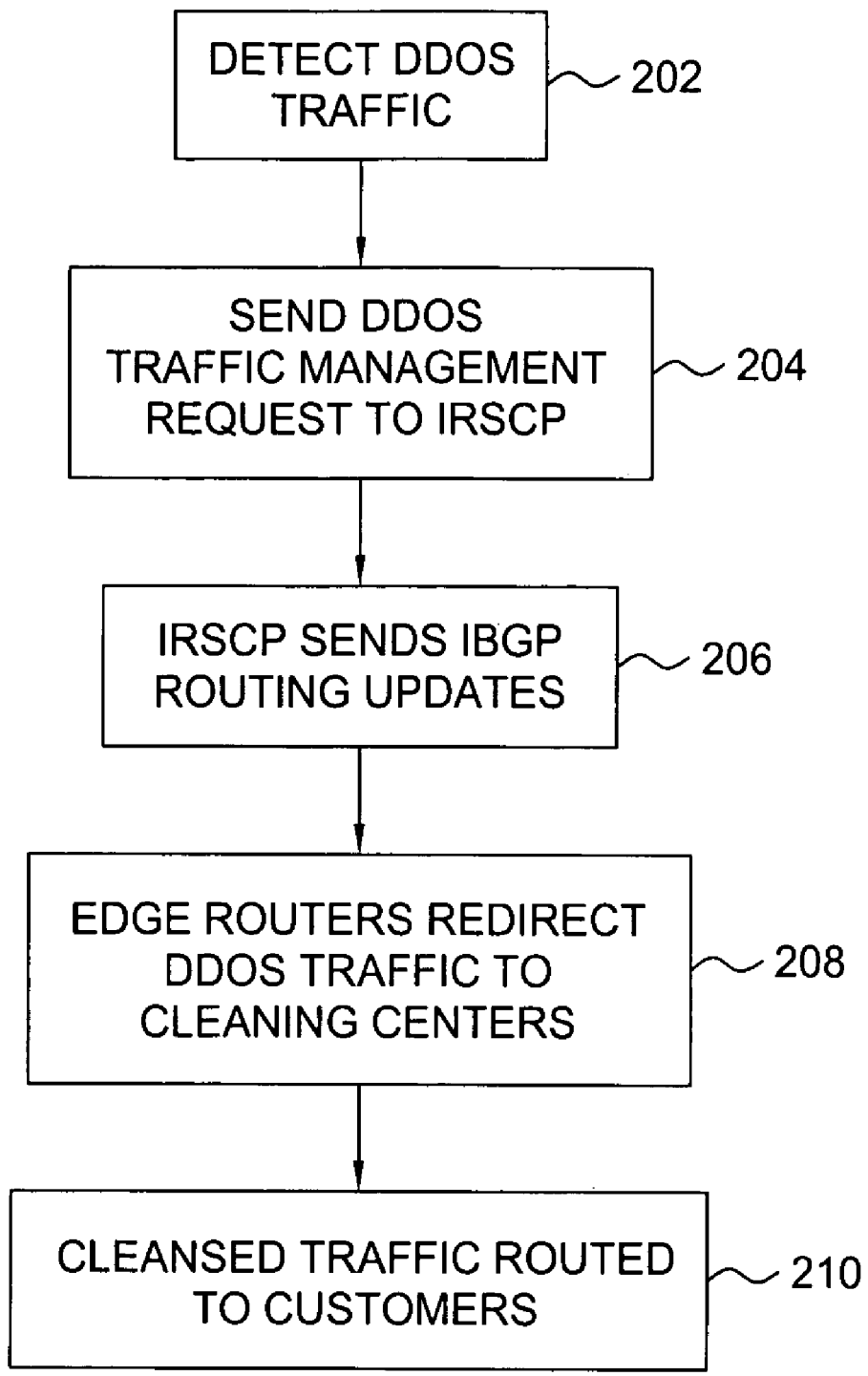
FIG. 2 depicts a flow diagram of a method of traffic management in accordance with the present invention.

FIG. 2 depicts a method in accordance with the present invention of dynamically performing traffic management when an attack is detected. The method 200 begins at step 202 when DDOS traffic is detected. One form of detection is to monitor the traffic patterns to identify a substantial increase in the volume of traffic that is addressed to a particular server. If the volume of traffic exceeds a threshold of traffic that can be handled by the server that is being addressed, the DDOS detection system will deem the server under attack. Other forms of attack detection are known in the art and can be used with the present invention.

At step 204, the DDOS detection systems 112 or 106 will send a DDOS traffic management request to the IRSCP 104. At step 206, the IRSCP 104 sends an IBGP routing update to the edge routers. Specifically the IRSCP 104 will determine which edge routers are being used to carry the DDOS traffic to the attacked server 108. These edge routers are instructed to route traffic that is being addressed to the attacked server 108 to the cleaning center 120. At step 208, the edge routers redirect DDOS traffic to at least one of a cleaning center 120 or to a null address (e.g., black holed). Generally there is more than one cleaning center 120 within a network 102 and the edge routers will route the offending traffic to the best cleaning center 120 based on a criteria such as at least one of the network load, utilization delay, traffic type and the like. The cleaning centers 120 remove the traffic that is to be denied service from the stream of traffic that is addressed to the attacked server 108. Legitimate traffic is then routed through edge router 116 and edge router 114 for delivery to the attacked server 108. Consequently, only the communications traffic from the attacker that is being sent to attacked server 108 will be removed by the cleaning center 120. All other traffic is routed to the attacked server 108. At step 210, the cleansed traffic is routed to the customers, in this case, attacked server 108. In this manner, the invention provides a dynamic and granular DDOS traffic management technique that limits the impact of an attacker upon the network.

While the foregoing is directed to embodiments of the present invention, other and further embodiments of the invention may be devised without departing from the basic scope thereof, and the scope thereof is determined by the claims that follow.

The invention claimed is:

1. A method of managing communications traffic within a communications network comprising:
   detecting traffic that requires denial of service;
   sending a denial of service request to a traffic routing control unit;
   determining via the traffic routing control unit a specific edge router that carries the traffic that requires denial of service, where the specific edge router is one of a plurality of edge routers within the communications network and where the specific edge router is located remotely from the traffic routing control unit; and
   after the determining, updating routing information for the specific edge router, by sending a routing update from the traffic routing control unit to the specific edge router, instructing the specific edge router of the plurality of edge routers to redirect the traffic that requires denial of service to a cleaning center, while enabling the specific edge router to deliver legitimate traffic.

2. The method of claim 1 further comprising:
   cleaning the traffic that requires denial of service such that legitimate traffic is routed to a customer that is being attacked.

3. The method of claim 1 wherein the detecting is performed within a neighbor router.

4. The method of claim 1 wherein the specific edge router forms a subset of the plurality of edge routers within the communications network.

5. The method of claim 1 further comprising:
   selecting the cleaning center based upon a criterion.

6. The method of claim 5 wherein the criterion comprises a network load.

7. A system for providing traffic management within a communications network interconnecting a plurality of edge routers, comprising:
   a traffic routing control unit within the communications network located remotely from the plurality of edge routers;
   a denial of service detection system, coupled to the communications network, for issuing a denial of service request to the traffic routing control unit, wherein the traffic routing control unit determines a select edge router that carries traffic that requires denial of service, where the select edge router is one of the plurality of edge routers; and
   a plurality of customer computers coupled to the plurality of edge routers, wherein, after the traffic routing control unit determines the select edge router, the traffic routing control unit sends updated routing information to the select edge router, instructing the select edge router to route the traffic that requires denial of service to a cleaning center while enabling the select edge router to deliver legitimate traffic.

8. The system of claim 7 wherein the cleaning center cleanses the traffic that requires denial of service.

9. The system of claim 7 wherein the denial of service detection system is located in a neighbor router.

10. The system of claim 7 wherein the select edge router forms a subset of the plurality of edge routers.

11. The system of claim 7 wherein the cleaning center is selected using a criterion.

12. The system of claim 11 wherein the criterion comprises a network load.

13. A method of managing communications traffic within a communications network comprising:
   sending a denial of service request to a traffic routing control unit that is deployed within the communications network;
   determining, via the traffic routing control unit, an edge router that carries traffic that requires denial of service, wherein the traffic routing control unit is located remotely from the edge router;
   after the determining, sending the edge router a routing update from the traffic routing control unit, instructing the edge router to route the traffic that requires denial of service to a cleaning center, while enabling the edge router to deliver legitimate traffic.

14. The method of claim 13 wherein the traffic that requires denial of service is traffic that is to be denied service.

15. The method of claim 13 further comprising:
   selecting the cleaning center based upon a criterion.

16. The method of claim 15 wherein the criterion comprises a network load.

17. The method of claim 13 wherein the controlling enables a management of distributed denial of service traffic by redirecting traffic from a source of the traffic that requires denial of service.

* * * * *